United States Patent
Dinan et al.

(10) Patent No.: US 8,285,291 B2
(45) Date of Patent: Oct. 9, 2012

(54) SYSTEM AND METHOD FOR MULTIMODE DEVICE HANDOVER

(75) Inventors: Esmail H. Dinan, Herndon, VA (US); Hemanth Balaji Pawar, Herndon, VA (US); Swati Tiwari, Austin, TX (US); Krishna Sitaram, Chantilly, VA (US); Jong-Hak Jung, Herndon, VA (US)

(73) Assignee: Clearwire IP Holdings LLC, Bellevue, WA (US)

( * ) Notice: Subject to any disclaimer, the term of this patent is extended or adjusted under 35 U.S.C. 154(b) by 397 days.

(21) Appl. No.: 12/698,384

(22) Filed: Feb. 2, 2010

(65) Prior Publication Data

US 2011/0189997 A1 Aug. 4, 2011

(51) Int. Cl.
*H04W 36/00* (2009.01)
(52) U.S. Cl. ............... 455/443; 455/436; 455/452.2; 455/448; 455/437; 455/438; 455/439; 455/440; 455/453; 370/331
(58) Field of Classification Search ............ 455/443, 455/436, 452.2, 448, 437, 438, 439, 440, 455/453; 370/331
See application file for complete search history.

(56) References Cited

U.S. PATENT DOCUMENTS

| | | | |
|---|---|---|---|
| 7,356,340 B2 | 4/2008 | Hamilton | |
| 7,492,752 B2 * | 2/2009 | Harris et al. | 370/342 |
| 2006/0092872 A1 | 5/2006 | Lee et al. | |
| 2008/0076430 A1 | 3/2008 | Olson | |
| 2009/0052399 A1 | 2/2009 | Silver et al. | |
| 2009/0067628 A1 | 3/2009 | Pudney et al. | |
| 2009/0111458 A1 | 4/2009 | Fox et al. | |
| 2009/0113543 A1 | 4/2009 | Adams et al. | |
| 2010/0248708 A1 * | 9/2010 | Koivisto et al. | 455/419 |

FOREIGN PATENT DOCUMENTS

WO WO 2009/053933 4/2009

OTHER PUBLICATIONS

International Search Report and Written Opinion for PCT/US2010/040091 mailed Sep. 1, 2010, 15 pages.

* cited by examiner

*Primary Examiner* — Wayne Cai
*Assistant Examiner* — Chuck Huynh
(74) *Attorney, Agent, or Firm* — Pillsbury Winthrop Shaw Pittman LLP

(57) ABSTRACT

Systems and methods of operating multimode 3G/4G communications devices in an overlapping 3G/4G coverage area (e.g., WiMAX or LTE/CDMA-EvDO) include determining a loading condition of the 3G and 4G base stations. If the 3G and 4G base stations are lightly loaded, one or more 4G Channel Quality Indicators (CQI) are compared with one or more corresponding 3G Data Rate Control (DRC) indices to determine which of the 3G and 4G networks allows a higher data throughput. The dual mode communications device is handed off to a 4G base station associated with the 4G coverage if the 4G network allows the higher data throughput; otherwise, the dual mode communications device is handed off to a 3G base station. User priorities, application categories, and/or MIMO and diversity modes may be used to determine handoff if the base stations are more than lightly loaded.

63 Claims, 9 Drawing Sheets

FIG. 1 (BACKGROUND)

EXAMPLE MCS/CQI TABLE - WIMAX

Figure 1:
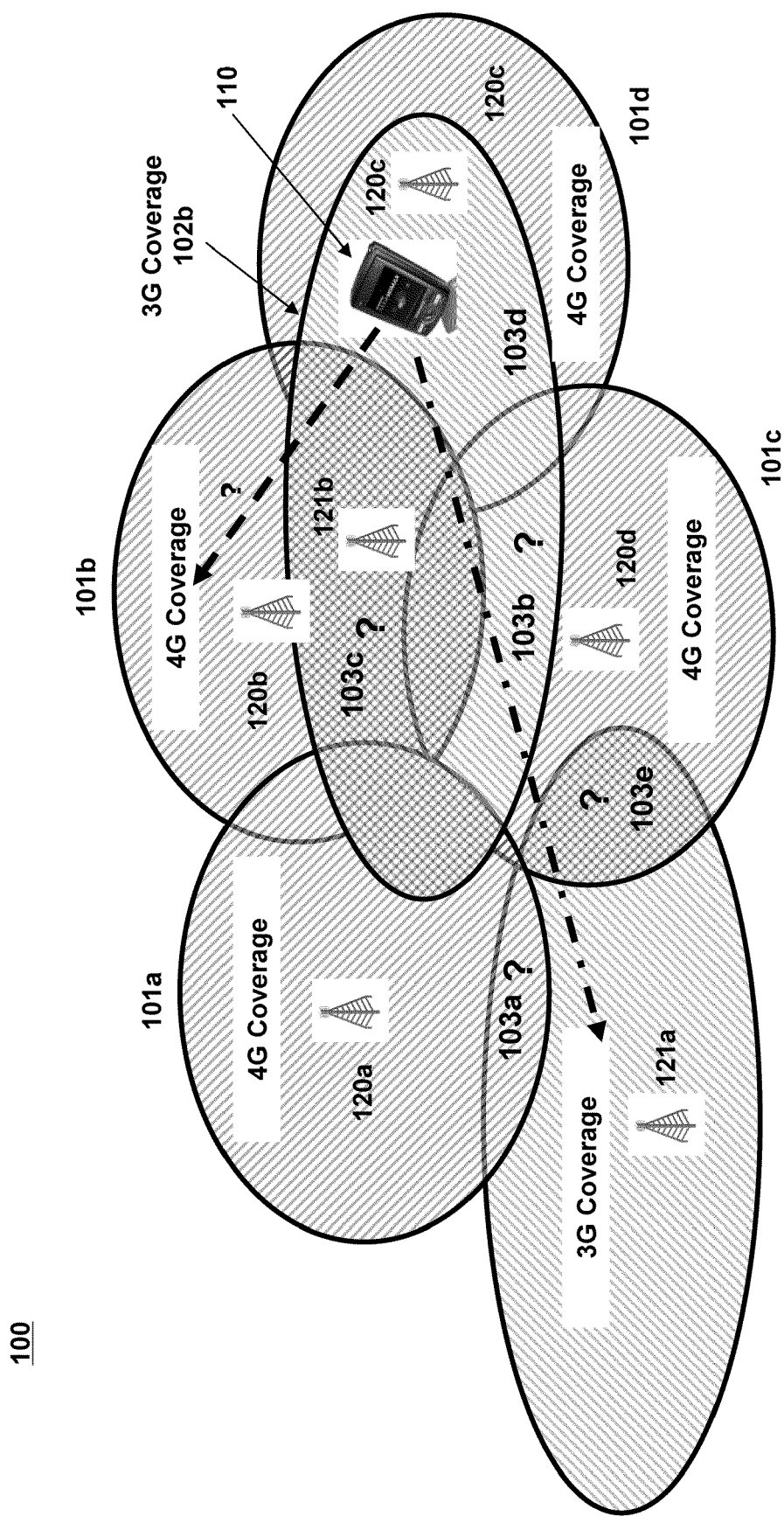

| CQI | CINR (dB) | DL MCS | MIMO | Sector Peak MAC Throughput (kbps) | User Peak MAC Throughput (kbps) |
|---|---|---|---|---|---|
| 0 | -3 or less | QPSK 1/12 | STC | 405.50 | 405.50 |
| 1 | -2 | QPSK 1/12 | STC | 405.50 | 405.50 |
| 2 | -1 | QPSK 1/8 | STC | 608.26 | 608.26 |
| 3 | 0 | QPSK 1/8 | STC | 608.26 | 608.26 |
| 4 | 1 | QPSK 1/4 | STC | 1,419.26 | 1,419.26 |
| 5 | 2 | QPSK 1/4 | STC | 1,419.26 | 1,419.26 |
| 6 | 3 | QPSK 1/4 | STC | 1,419.26 | 1,419.26 |
| 7 | 4 | QPSK 1/4 | STC | 1,419.26 | 1,419.26 |
| 8 | 5 | QPSK 1/2 | STC | 2,838.53 | 2,838.53 |
| 9 | 6 | QPSK 1/2 | STC | 2,838.53 | 2,838.53 |
| 10 | 7 | QPSK 1/2 | STC | 2,838.53 | 2,838.53 |
| 11 | 8 | QPSK 3/4 | STC | 4,460.54 | 4,460.54 |
| 12 | 9 | QPSK 3/4 | STC | 4,460.54 | 4,460.54 |
| 13 | 10 | QPSK 3/4 | STC | 4,460.54 | 4,460.54 |
| 14 | 11 | 16-QAM 1/2 | STC | 5,879.81 | 5,677.06 |
| 15 | 12 | 16-QAM 1/2 | STC | 5,879.81 | 5,677.06 |
| 16 | 13 | 16-QAM 1/2 | STC | 5,879.81 | 5,677.06 |
| 17 | 14 | 16-QAM 3/4 | STC | 9,123.84 | 8,921.09 |
| 18 | 15 | 16-QAM 3/4 | STC | 9,123.84 | 8,921.09 |
| 19 | 16 | 16-QAM 3/4 | STC | 9,123.84 | 8,921.09 |
| 20 | 17 | 64-QAM 2/3 | STC | 12,165.12 | 8,110.08 |
| 21 | 18 | 64-QAM 2/3 | STC | 12,165.12 | 8,110.08 |
| 22 | 19 | 64-QAM 3/4 | STC | 13,787.14 | 8,921.09 |
| 23 | 20 | 64-QAM 5/6 | STC | 15,403.15 | 8,732.10 |
| 24 | 21 | 64-QAM 5/6 | STC | 15,403.15 | 8,732.10 |
| 25 | 22 | 64-QAM 5/6 | STC | 15,403.15 | 8,732.10 |
| 26 | 23 | 64-QAM 5/6 | STC | 15,403.15 | 8,732.10 |
| 27 | 24 | 64-QAM 1/2 | SM | 18,247.68 | 5,677.06 |
| 28 | 25 | 64-QAM 1/2 | SM | 18,247.68 | 5,677.06 |
| 29 | 26 | 64-QAM 1/2 | SM | 18,247.68 | 5,677.06 |
| 30 | 27 | 64-QAM 2/3 | SM | 24,330.24 | 8,110.08 |
| 31 | 28 | 64-QAM 2/3 | SM | 24,330.24 | 8,110.08 |
|  | 29 | 64-QAM 2/3 | SM | 24,330.24 | 8,110.08 |
|  | 30 | 64-QAM 3/4 | SM | 27,574.27 | 8,921.09 |
|  | 31 | 64-QAM 3/4 | SM | 27,574.27 | 8,921.09 |
|  | 32 | 64-QAM 3/4 | SM | 27,574.27 | 8,921.09 |
|  | 33 or greater | 64-QAM 5/6 | SM | 30,818.30 | 9,732.10 |

FIG. 5A

EXAMPLE MCS/DRC TABLE - EvDO

| DRC Index | DL MCS | Time Slots | Data rate (kbps) |
|---|---|---|---|
| 0 | - | 0 | 0 |
| 1 | QPSK 1/5 | 16 | 38.4 |
| 2 | QPSK 1/5 | 8 | 76.8 |
| 3 | QPSK 1/5 | 4 | 153.6 |
| 4 | QPSK 1/5 | 2 | 307.2 |
| 5 | QPSK 1/5 | 4 | 307.2 |
| 6 | QPSK 1/3 | 1 | 614.4 |
| 7 | QPSK 1/3 | 2 | 614.4 |
| 8 | QPSK 1/3 | 2 | 921.6 |
| 9 | 8-PSK 1/3 | 1 | 1228.8 |
| 10 | 8-PSK 1/3 | 2 | 1228.8 |
| 11 | 16-QAM 1/3 | 1 | 1843.2 |
| 12 | 16-QAM 1/3 | 1 | 2457.6 |
| 13 | 16-QAM 1/3 | 2 | 1536 |
| 14 | 16-QAM 1/3 | 1 | 3072 |

FIG. 5C

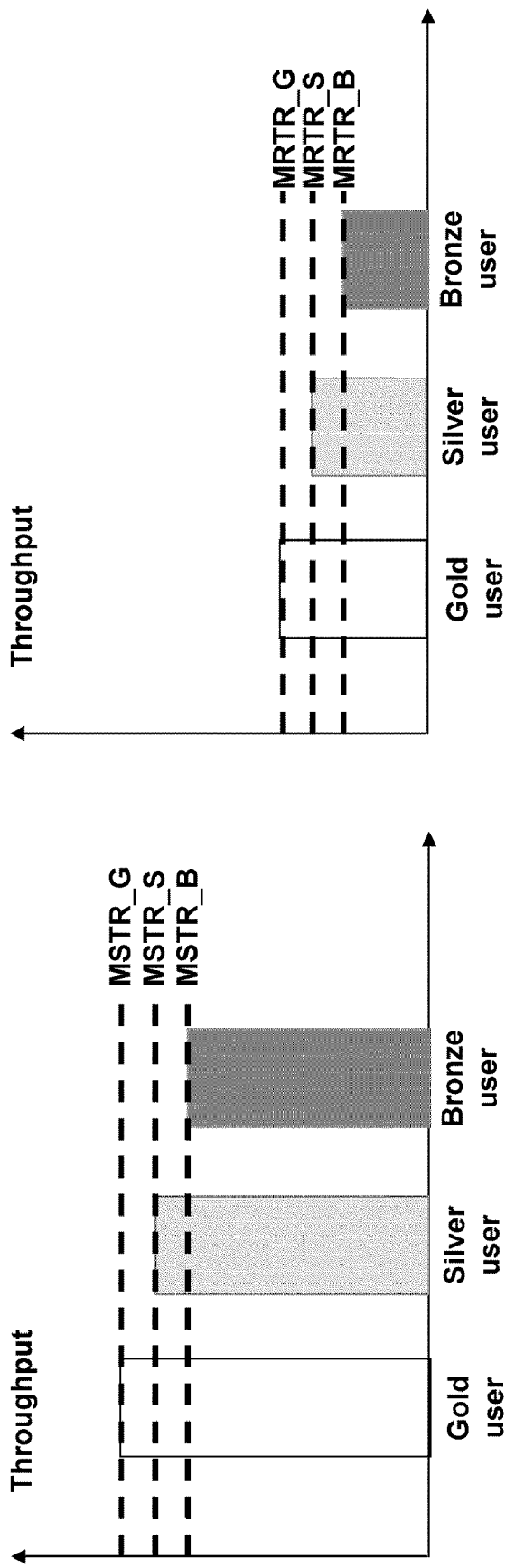
FIG. 6A (BACKGROUND)
FIG. 6B (BACKGROUND)

| Example Mapping of Application to QoS ||
|---|---|
| Application Type | QoS Category |
| HD Video Streaming | C1 |
| Video Conferencing | C1 |
| Conversational Voice and Video | C1 |
| LD Video Streaming | C2 |
| Audio Streaming | C2 |
| Web browsing | C3 |
| Email, fax, ftp | C3 |
| Peer-to-Peer | C3 |

FIG. 7

SYSTEM AND METHOD FOR MULTIMODE DEVICE HANDOVER

BACKGROUND

This disclosure is generally related to high speed wireless packet-based data networks and devices. In particular, this disclosure is related to multimode devices capable of operating in both third and fourth generation ("3G" and "4G") wireless networks. Examples of 3G wireless technologies includes Code Division Multiple Access (CDMA) and Evolution-Data Optimized or Evolution-Data only ("EvDO")/CDMA. Examples of 4G wireless technologies include Worldwide Interoperability for Microwave Access ("WiMAX") technologies and Long Term Evolution (LTE) technologies. 4G next-generation networks are characterized by reliance upon the Internet Protocol (IP) and packet-based signaling, along with improved uplink/downlink modulation coding schemes (MCS) and data rates.

3G Networks

International Mobile Telecommunications-2000 (IMT-2000), better known as "3G" or 3rd Generation, is a family of standards for wireless communications defined by the International Telecommunication Union, which includes GSM EDGE, UMTS, and CDMA2000, as well as DECT. Services include wide-area wireless voice telephone, video calls, and wireless data, all in a mobile environment. Compared to earlier 2G and 2.5G services, 3G allows simultaneous use of speech and data services and higher data rates (up to 14.4 Mbit/s on the downlink and 5.8 Mbit/s on the uplink with certain enhancements). Thus, 3G networks enable network operators to offer users a wider range of more advanced services while achieving greater network capacity through improved spectral efficiency. Generally, 3G devices benefit from both a larger footprint coverage area, as well as national coverage.

EvDO

EvDO, or Evolution Data Only/Evolution Data Optimized, is a 3G mobile broadband technology used by various wireless carriers such as Verizon, Sprint, and Alltel that provides typical speeds of 600-1400 kbps download (with bursts up to 2000 kbps) and 500-800 kbps upload by wireless transmission. EvDO is a telecommunications standard for the wireless transmission of data through radio signals, typically for broadband Internet access. The resulting Internet connection may be shared with multiple computers using a 3G router, similar to a conventional broadband connection. It is standardized by 3rd Generation Partnership Project 2 (3GPP2) as part of the CDMA2000 family of standards, and has been adopted by many mobile phone service providers around the world—particularly those previously employing CDMA networks.

4G Networks

International Mobile Telecommunications-Advanced (IMT Advanced), better known as "4G", "4th Generation", or "Beyond 3G", is the next technological strategy in the field of wireless communications. A 4G system may upgrade existing communication networks and is expected to provide a comprehensive and secure IP based solution where facilities such as voice, data and streamed multimedia will be provided to users on an "anytime, anywhere" basis, and at much higher data rates compared to previous generations. 4G devices provide higher speed and increased Quality of Service ("QoS") than their 3G counterpart devices.

WiMAX

One 4G technology, WiMAX 4G, is not yet fully deployed with ubiquitous coverage. However, multimode WiMAX 3G/4G devices are entering the market. For example, several multi-technology conventional devices exist that operate as multimode WiMAX/CDMA EvDO devices. Typically, 3G systems provide higher coverage footprint and national coverage, while 4G provides higher speed and improved QoS. As subscribers move about and roam between service areas, it is important that multi-technology handoff is implemented without incurring service interruption. For such conventional WiMAX/CDMA EvDO multimode devices, the priority is always to look for a WiMAX system first. If a WiMAX system is not available, then the device looks for an EvDO system. If the EvDO system is not available, then the device looks for a CDMA system.

WiMAX systems present various traffic scheduling challenges. For example, the quality of the wireless channel is typically different for different users and randomly changes with time (on both slow and fast time scales). Further, wireless bandwidth is considered to be a scarce resource that needs to be used efficiently (i.e., you can not overprovision the wireless link). In addition, an excessive amount of interference and higher error rates are typically experienced. Scheduling decides the modulation coding scheme (MCS) and affects error rate, and error rate affects the choice of MCS. In general, mobility complicates resource allocation.

To support multimedia applications, the mobile WiMAX IEEE 802.16e standard defines five types of data delivery service flows for downlink (DL) flows and five corresponding scheduling services for uplink (UL) flows: UGS—Unsolicited Grant Service, with constant bit-rate services (CBR); rtPS—Real Time Polling Service, with variable bit-rate, but sensitive to delay; ertPS—Extended Real Time Polling Service, for VoIP with silence suppression, similar to CBR with gaps; nrtPS—Non-real Time Polling Service, time insensitive, but require a minimum bandwidth allocation; and BE—Best Effort. Uplink is differentiated from downlink because uplink flows (except UGS) involve some form of request/grant mechanism for resource allocations. Table I summarizes the various WiMAX data service types.

TABLE I

WiMAX Data Delivery Services

| DL data delivery service | UL scheduling service | Targeted traffic |
| --- | --- | --- |
| Unsolicited grant service (UGS) | Unsolicited grant service (UGS) | Constant bit rate (CBR) services, TDM services |
| Extended real-time Variable Rate (ERT-VR) | Extended real-time polled service (ertPS) | VoIP with silence suppression/activity detection |
| Real-time Variable Rate (RT-VR) | Real-time polled service (rtPS) | Streaming audio & video |
| Non-real-time Variable Rate (NRT-VR) | Non-real-time polled service (nrtPS) | File transfers |
| Best Effort (BE) | Best Effort (BE) | Web browsing, e-mail, etc. |

Each of these service flow types has a different QoS requirements and is designed to support different types of traffic streams. The order of priority given to services while transmitting is generally as follows: UGS>ertPS>rtPS>nrtPS. However, the particular scheduling mechanism is generally left to be defined by proprietary implementations.

Since the BS governs resource scheduling, uplink resources must either be allocated automatically on a periodic basis, or requested individually as needed by the MS. Resources for UGS and ertPS service flows are periodically allocated according to an unsolicited grant interval (UGI) defined for each service flow. The ertPS service flows can also dynamically request additional resources, i.e., more throughput, as described below. Resources for rtPS, nrtPS and BE service flows must be individually requested (usually triggered by data in the MS buffer.) The BS can automatically offer dedicated uplink opportunities for specific ertPS, rtPS and nrtPS service flows to request bandwidth on a periodic basis (unsolicited polling interval). The ertPS, rtPS, nrtPS and BE service flows can also request bandwidth during a shared uplink opportunity, subject to contention. Once UL resources have been granted, requests for additional UL resources can be "piggybacked" on existing allocations.

While WiMAX defines the QoS parameters for each service flow type, it does not specify how the scheduler uses these parameters to allocate air interface resources. Radio Access Network (RAN) suppliers have employed different scheduling algorithms. Not all suppliers directly consider all the QoS parameters when allocating air interface resources. In some cases, suppliers assume a particular scheduling algorithm will minimize latency or jitter, without actually measuring and adjusting allocations to achieve the targeted performance.

FIGS. 6A and 6B illustrate conventional WiMAX network concepts of assigning different throughput parameters (related to available bandwidth) for each of three "Best Effort" (BE) user classes, i.e., Gold, Silver, and Bronze users. These throughput parameters include a maximum sustainable traffic rate (MSTR) for each of the three user classes, i.e., MSTR_G, MSTR_S, and MSTR_B (FIG. 6A), and minimum reserved traffic rate (MRTR) for each of the three user classes, i.e., MRTR_G, MRTR_S, and MRTR_B (FIG. 6B). Gold class service typically may involve the highest user fee and have the highest targeted bandwidth. Silver class service involves a medium level of user fee, and less bandwidth than Gold class service. Bronze class service may involve the lowest fee with generally good bandwidth, but less bandwidth than both Gold and Silver class service.

A variety of conventional standalone mechanisms are used to provide different levels of control over user performance. Call Admission Control (CAC) used for non-BE flows (e.g., "real-time" voice or data) can be used to set some resources aside for BE. Traffic priority parameters can be used for intra-user distinction. Thresholds for MRTR and MSTR are also used to control throughput. However, these conventional approaches have drawbacks.

Conventional approaches with multimode 3G/4G devices are generally limited to the use of radio frequency (RF) signal conditions such as received signal strength indication (RSSI) and carrier-to-interference noise ratio (CINR) for handoff between 3G and 4G modes, e.g., EvDO and WiMAX modes. More recent multi-technology handoff algorithms may also consider network loading as a triggering mechanism. However, these approaches limit the flexibility of the mobile station (MS) to choose between the two networks. Such conventional approaches have drawbacks in terms of optimizing the use of limited network resources and the customers' experience. One situation that may arise and which is not conventionally dealt with in an optimal manner is when equally good 3G (e.g., EvDO) and 4G (e.g., WiMAX or LTE) device coverage exists, for example.

LTE

LTE is the project name of a high performance air interface for cellular mobile communication systems and is a step toward 4G radio technologies designed to increase the capacity and speed of mobile telephone networks. Where the current generation of mobile telecommunication networks are collectively known as 3G, LTE is marketed as 4G. However, it does not fully comply with the International Mobile Telecommunications (IMT) Advanced 4G requirements. Most major mobile carriers in the United States and several worldwide carriers have announced plans to convert their networks to LTE beginning in 2009. LTE is a set of enhancements to the Universal Mobile Telecommunications System (UMTS) which is introduced in 3rd Generation Partnership Project (3GPP) Release 8, with further enhancements in Release 9. These enhancements focus on adopting 4G mobile communications technology, including an all-IP flat networking architecture.

The LTE standard includes:
For every 20 MHz of spectrum, peak download rates of 326.4 Mbit/s for 4×4 antennas, and 172.8 Mbit/s for 2×2 antennas.
Peak upload rates of 86.4 Mbit/s for every 20 MHz of spectrum using a single antenna.
Five different terminal classes have been defined from a voice centric class up to a high end terminal that supports the peak data rates. All terminals will be able to process 20 MHz bandwidth.
At least 200 active users in every 5 MHz cell. (Specifically, 200 active data clients).
Sub-5 ms latency for small IP packets.
Increased spectrum flexibility, with spectrum slices as small as 1.5 MHz (and as large as 20 MHz) supported.
Optimal cell size of 5 km, 30 km sizes with reasonable performance, and up to 100 km cell sizes supported with acceptable performance.
Co-existence with legacy standards.
Support for MBSFN (Multicast Broadcast Single Frequency Network) which can deliver services such as Mobile TV using the LTE infrastructure, and is a competitor for DVB-H-based TV broadcast.
Per-User Unitary Rate Control (PU2RC), an advanced MIMO technique, i.e., a practical solution for MU-MIMO, which effectively utilizes multiuser precoding and scheduling to enhance the system performance of multiple antenna networks will be handled in a future release, i.e., LTE Release 10 and beyond (LTE-Advanced).

A large amount of the LTE development work is aimed at simplifying the architecture of the LTE system, as it transits from the existing UMTS circuit-switched/packet switched combined network, to an all-IP flat architecture system.

The LTE air interface, E-UTRA (Evolved UTRAN, the E-prefix being common to the evolved equivalents of older UMTS components) is used by UMTS operators deploying their own wireless networks. Release 8 was intended not just for use over E-UTRA, but may also be used over any other IP network, including WiMAX and WiFi, and even wired networks.

The E-UTRAN system uses Orthogonal Frequency-Division Multiple Access (OFDMA) for the downlink (tower to handset) and Single Carrier Frequency Division Multiple Access (SC-FDMA) for the uplink and employs Multiple-Input-Multiple-Output (MIMO) with up to four antennas per station. The channel coding scheme for transport blocks is turbo coding and a contention-free quadratic permutation polynomial (QPP) turbo code internal interleaver.

LTE's use of Orthogonal frequency-division multiplexing (OFDM), a system where the available spectrum is divided into many thin carriers, each on a different frequency and each carrying a part of the signal, enables E-UTRAN to be much more flexible in its use of spectrum than the older CDMA based systems that dominated 3G. CDMA networks require large blocks of spectrum to be allocated to each carrier, to maintain high chip rates, and thus maximize efficiency. Building radios capable of coping with different chip rates (and spectrum bandwidths) is more complex than creating radios that only send and receive one size of carrier, so generally CDMA based systems standardize both.

LTE supports both Frequency Division Duplex (FDD) and Time Division Duplex (TDD) modes. While FDD makes use of paired spectra for uplink (UL) and downlink (DL) transmission separated by a duplex frequency gap, TDD alternates by using the same spectral resources used for UL and DL, separated by guard time. Each mode has its own frame structure within LTE and these are aligned with each other meaning that similar hardware can be used in the base stations and terminals to allow for economy of scale. The TDD mode in LTE is aligned with Time Division Synchronous Code Division Multiple Access (TD-SCDMA), as well allowing for coexistence.

LTE uses OFDM for the downlink—that is, from the base station to the terminal. OFDM meets the LTE requirement for spectrum flexibility and enables cost-efficient solutions for very wide carriers with high peak rates. OFDM is a well-established technology, for example in standards such as IEEE 802.11a/g, 802.16, HIPERLAN-2, DVB and DAB.

In the LTE downlink, there are three main physical channels. The Physical Downlink Shared Channel (PDSCH) is used for all the data transmission, the Physical Multicast Channel (PMCH) is used for broadcast transmission using a Single Frequency Network, and the Physical Broadcast Channel (PBCH) is used to send most important system information within the cell. Supported modulation formats on the PDSCH are Quadrature Phase Shift Keying (QPSK), 16 Quadrature Amplitude Modulation (QAM) and 64 QAM. For MIMO operation, a distinction is made between single user MIMO, for enhancing one user's data throughput, and multi user MIMO for enhancing the cell throughput.

In LTE's uplink, for the Physical Uplink Shared channel (PUSCH) only, LTE uses a pre-coded version of OFDM called Single Carrier Frequency Division Multiple Access (SC-FDMA). This is to compensate for a drawback with normal OFDM, which has a very high peak-to-average power ratio (PAPR). High PAPR requires expensive and inefficient power amplifiers with high requirements on linearity, which increases the cost of the terminal and drains the mobile station's battery faster. SC-FDMA solves this problem by grouping together the resource blocks in a way that reduces the need for linearity and thereby power consumption in the power amplifier. A low PAPR also improves coverage and the cell-edge performance.

In LTE's uplink, there are three physical channels. While the Physical Random Access Channel (PRACH) is only used for initial access and when the User Equipment (UE) or MS is not uplink synchronized, all the data is sent on the Physical Uplink Shared Channel (PUSCH). If there is no data to be transmitted on Uplink for a UE, control information would be transmitted on the Physical Uplink Control Channel (PUCCH). Supported modulation formats on the uplink data channel are QPSK, 16 QAM and 64 QAM.

If virtual MIMO/Spatial division multiple access (SDMA) is introduced, the data rate in the uplink direction can be increased depending on the number of antennas at the base station. With this technology more than one mobile can reuse the same resources.

WiMAX and LTE have many similar futures. For example, WiMAX utilizes CQI, throughput, CINR, and MIMO that are all present in LTE. One difference is in the naming convention used for MIMO in LTE. In LTE, downlink MIMO-A is called "downlink transmit diversity", and MIMO-B, as it is defined in WiMAX, is called Multi-User-MIMO (MU-MIMO).

What is needed is a system and method for a multimode 3G/4G device to transition between 3G and 4G networks without relying solely (or at all) on received signal strength or signal strength and network loading, and instead utilizes network loading and/or traffic type or user priority to determine handoff. What is even further needed is a system and method that allow a multimode or dual-mode 3G/4G device to seamlessly transition back and forth between 3G and 4G (e.g., CDMA EvDO and WiMAX/LTE) modes of operation in a manner that better utilizes scarce network resources and improves user satisfaction as compared to conventional multimode devices, particularly when located in areas that provide equally acceptable 3G and 4G coverage.

SUMMARY

The apparatus and method of this disclosure provide various features, functions, and capabilities as discussed more fully in the detailed description. For example, this disclosure provides a novel and useful system and method for use in a communications system, with particular application in wireless telecommunication systems such as those adhering to IEEE 802.16 (Wireless Metropolitan Area Networks—WMAN), IEEE 802.16e (mobile WiMAX), 3rd Generation Partnership Project (3GPP) Releases 8 and 9, and LTE-Advanced communication standard specifications and/or communication standards for CDMA, EvDO, WiMAX, and LTE. However, this disclosure is not necessarily limited to use with such systems and methods.

In one or more embodiments, this disclosure is directed to a system and method useful for multimode device handover, for example, multimode "3G" and "4G" devices, referred to as multimode 3G/4G devices. More particularly, this disclosure is directed to a system and method for multimode high-speed wireless packet-based 4G devices (e.g., LTE or WiMAX, collectively "4G device") and 3G CDMA devices, in particular, a system and method for efficiently triggering handoff between 3G and 4G modes in multimode 3G/4G devices in terms of both network resource utilization and user satisfaction, including multimode 3G/4G devices that operate in Evolution-Data Optimized or Evolution-Data only ("EvDO")/CDMA and WiMAX or LTE 4G overlay networks.

Various embodiments of this disclosure are useful to transition a 3G/4G multimode device (e.g., WiMAX/CDMA EvDO or LTE/CDMA EvDO) multimode device between networks when the device moves from CDMA-only area to the 4G and 3G overlay area, and from a 4G area (e.g., a WiMAX or LTE-only area) to a WiMAX/LTE and CDMA overlay area.

The various embodiments disclosed herein generally may be realized by software enhancements to already existing dual-mode 3G/4G devices without requiring hardware modifications in the RAN.

In one or more embodiments of this disclosure, in areas where 4G service is not available, dual or multimode devices will handoff to an available 3G network. However, in areas where there is considerable coverage overlap between the two networks, a dual-mode device or mobile station (MS) will consider several other factors to determine which network it will effect a handoff. These factors may include network loading; user priority, determined by the rate plan and application Quality of Service (QoS); a multi-input, multi-output (MIMO) mode (A, B, 4×2, 4×4, etc.); and Channel Quality Indicator/Data Request Channel (CQI/DRC) (for WiMAX to EvDO handoffs) versus network-specific modulation and coding scheme (MCS) mapping.

Examples of user priority as determined, for example, by the rate plan and application QoS for WiMAX may include P1: Gold or Silver user with UGS or eRTPS application; P2: Gold or Silver user with rTPS or nrTPS or Best Effort (BE) application; and P3: Bronze user with any application.

In one embodiment, a method of operating a dual-mode 3G/4G communications device capable of operating in either a 3G or 4G network when in an area with overlapping 3G and 4G coverage includes determining a loading condition of each of a 4G base station and a 3G base station associated with the overlapping 4G and 3G coverage area. Responsive to a determination that each of the 3G and 4G base stations are loaded less than a first user determined load factor, i.e., they are "lightly loaded", a processor is used to compare one or more Channel Quality Indicators (CQI), e.g., one or more WiMAX Channel Quality Indicators (CQI) or LTE CQI's, with one or more corresponding 3G Data Rate indices, e.g., EvDO Data Rate Control (DRC) indices, stored in corresponding mapping tables in a memory. The comparison result is evaluated by the processor to determine which of the 3G and 4G networks allows a higher data throughput. The dual or multimode communications device is handed off to a 4G base station associated with the 4G coverage, e.g., a WiMAX or LTE BS, if the 4G network allows the higher data throughput. Otherwise, the dual mode communications device is handed off to a 3G BS associated with the 3G coverage, e.g., an EvDO BS. In the event that both the 3G and 4G base stations are not lightly loaded, other factors may be used, including a user priority, an application category, and/or a MIMO mode including space-time coding techniques or spatial multiplexing techniques available.

In another embodiment, a dual-mode 4G and 3G communications apparatus capable of operating in either a 3G mode or a 4G mode when in an area with overlapping 3G and 4G coverage includes a 3G transceiver configured to transmit and receive information over a 3G network (e.g., a CDMA network); a 4G transceiver configured to selectively transmit and receive data over a 4G network (e.g., a WiMAX or LTE network); a processor operatively coupled to the 3G transceiver and the 4G transceiver and which is configured to determine a loading condition of each of a 4G base station and a 3G base station associated with the overlapping 3G and 4G coverage area; and a memory device operatively coupled to the processor. Responsive to a determination by the processor that each of the 3G and 4G base stations are loaded less than a first user determined load factor, the processor is configured to compare one or more 4G Quality Indicators, e.g., WiMAX or LTE Channel Quality Indicators (CQI), with one or more corresponding 3G data rate control indices, e.g., EvDO Data Rate Control (DRC) indices, stored in corresponding mapping tables in the memory. The processor evaluates the comparison result to determine which of the 3G and 4G networks allows a higher data throughput. If the 4G network allows the higher data throughput, the processor enables control signals that transfer or maintain communication of the dual mode communications device with a 4G base station associated with the 4G coverage, and if the 3G network allows the higher data throughput, the processor enables different control signals that transfer communication of the dual mode communications device to an 3G base station associated with the 3G coverage.

In another embodiment, a computer-readable medium has computer readable code physically embodied thereon which, when executed by a processor arranged in a dual-mode 3G/4G communications device capable of operating in either a 3G mode, e.g., a CDMA/EvDO mode, or a 4G mode, e.g., a WiMAX mode, causes the processor to carry out the functions of determining a loading condition of each of a 4G base station and a 3G base station associated with an overlapping 3G and 4G coverage area. Responsive to a determination that each of the 3G and 4G base stations are loaded less than a first user inputted load factor, a processor is instructed to compare one or more 4G Channel Quality Indicators with one or more corresponding 3G Data Rate Control (DRC) indices stored in corresponding mapping tables in a memory. The processor is further instructed to use the comparison result to determine which of the 3G and 4G networks allows a higher data throughput. Instructions further cause handing off the dual mode communications device to a 4G base station associated with the 4G coverage if the 4G network, e.g., a WiMAX or LTE network, allows higher data throughput, and to otherwise hand off the dual mode communications device to a 3G BS, e.g., an EvDO BS associated with the 3G coverage.

In another embodiment, a memory for storing data for access by an application program being executed by a processor in a dual-mode 3G/4G communications system capable of selectively operating in a 3G mode or a 4G mode includes a data structure stored in the memory, the data structure including information resident in a database used by the application program and including one or more 4G Channel Quality Indicators (CQI) mapped to one or more corresponding 3G Data Rate Control (DRC) indices associated with a plurality of available data throughput rates.

In another embodiment, a method of over-the-air provisioning of program functionality and data stored in a dual-mode 3G/4G communications device capable of operating in a 3G or 4G mode includes sending program instruction updates to the dual-mode device over a communications link from a base station (BS), wherein the program instruction updates include computer code that, when executed by a processor: determines a loading condition of each of a 4G base station and a 3G base station associated with an overlapping 3G and 4G coverage area, compares one or more 4G Channel Quality Indicators (CQI) with one or more corresponding 3G Data Rate Control (DRC) indices stored in corresponding mapping tables in a memory if each of the 3G and 4G base stations are loaded less than a first user inputted load factor, determines which of the 3G and 4G networks allows a higher data throughput, causes the dual mode communications device to transfer to a 4G base station associated with the 4G coverage if the 4G network allows the higher data throughput or causes the dual mode communications device to transfer to an 3G base station associated with the 3G coverage if the 3G network allows a higher data throughput. Data updates may also be sent to the dual-mode device over the communications link from the BS, wherein the data updates include 4G Channel Quality Indicators (CQI) mapped to one or more corresponding 3G Data Rate Control (DRC) indices. The over-the-air provisioning method may also include storing the program instruction updates and the data updates in a memory in the dual mode communications device.

BRIEF DISCUSSION OF THE DRAWINGS

Figure 2:
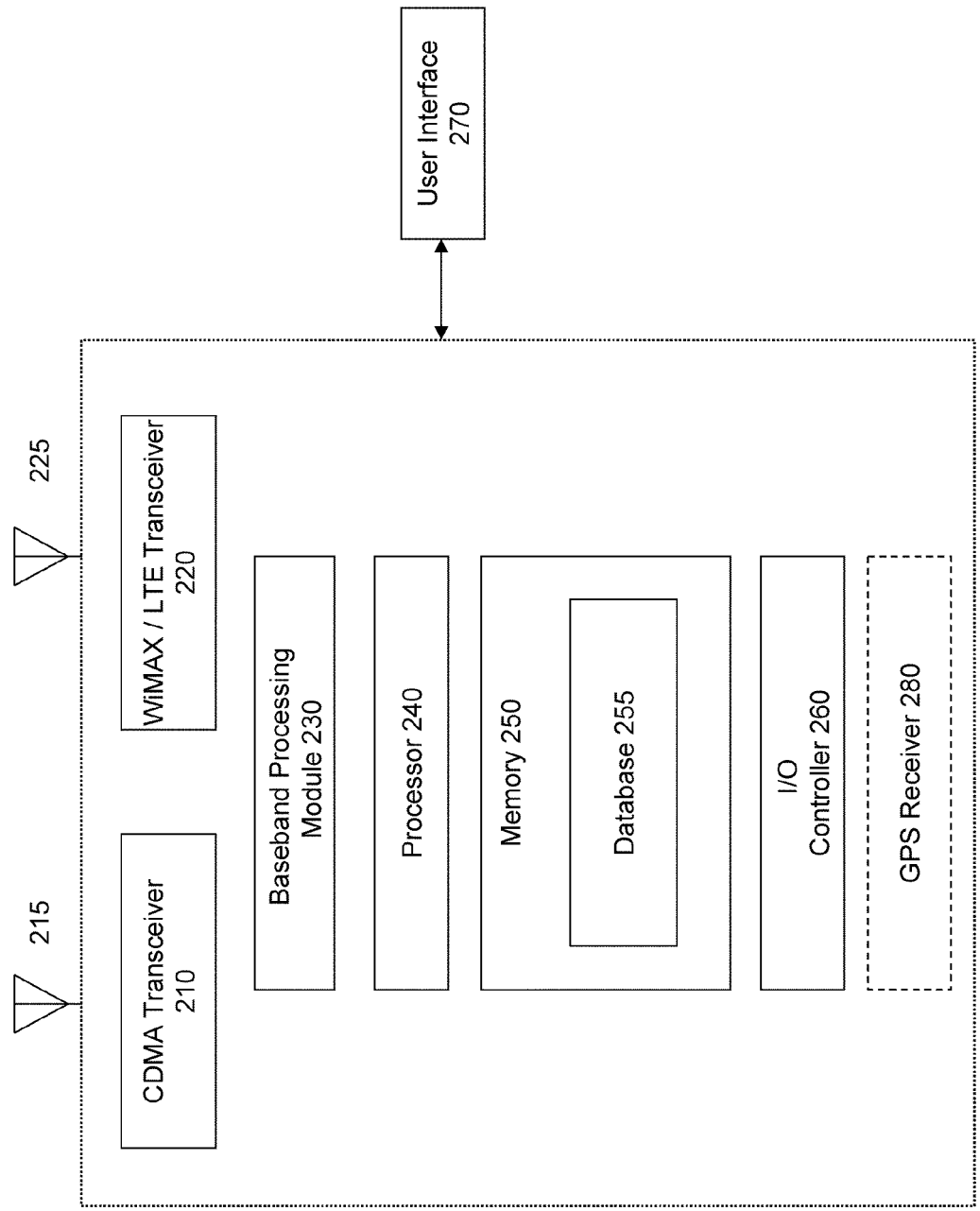
Figure 3:
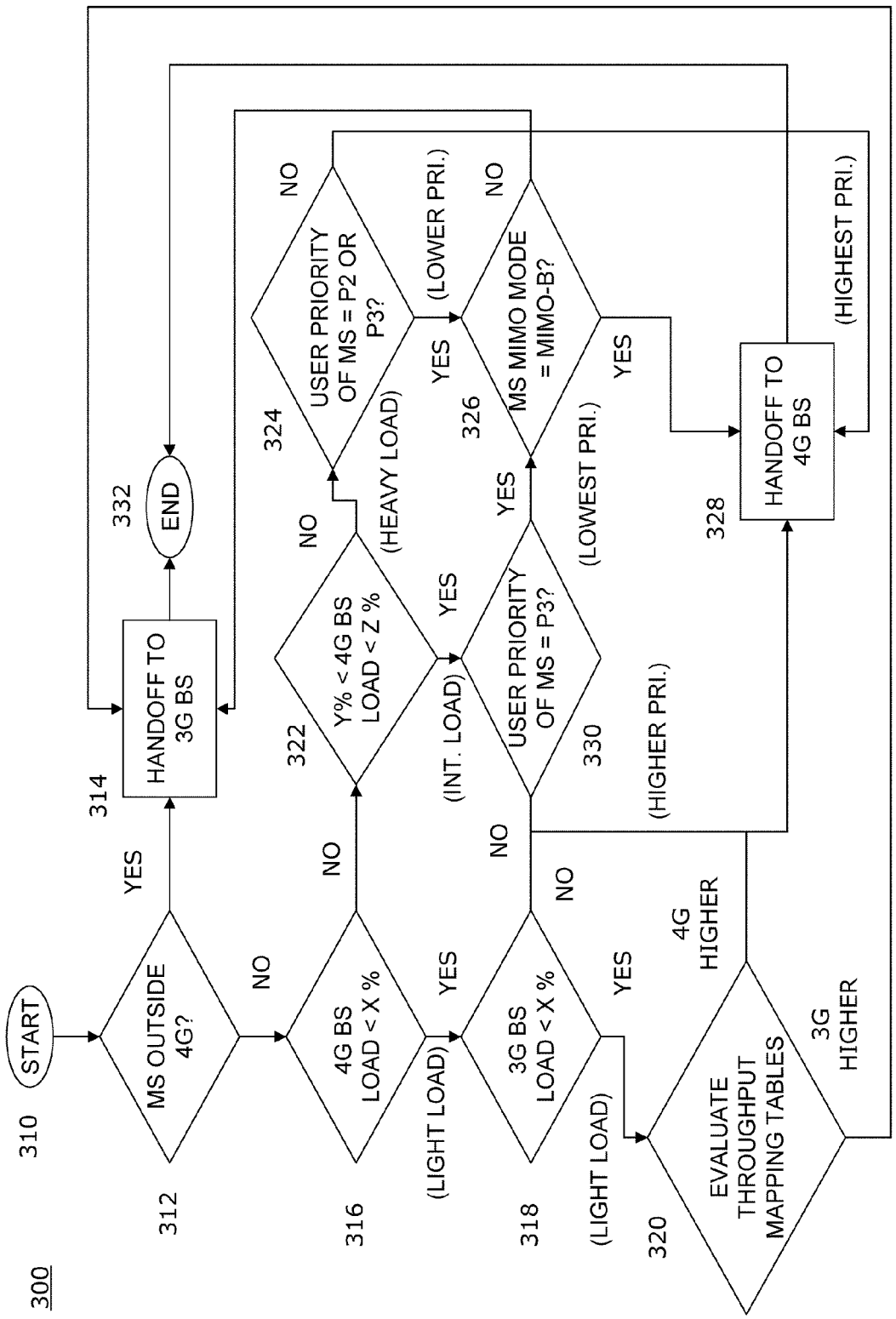
Figure 4:
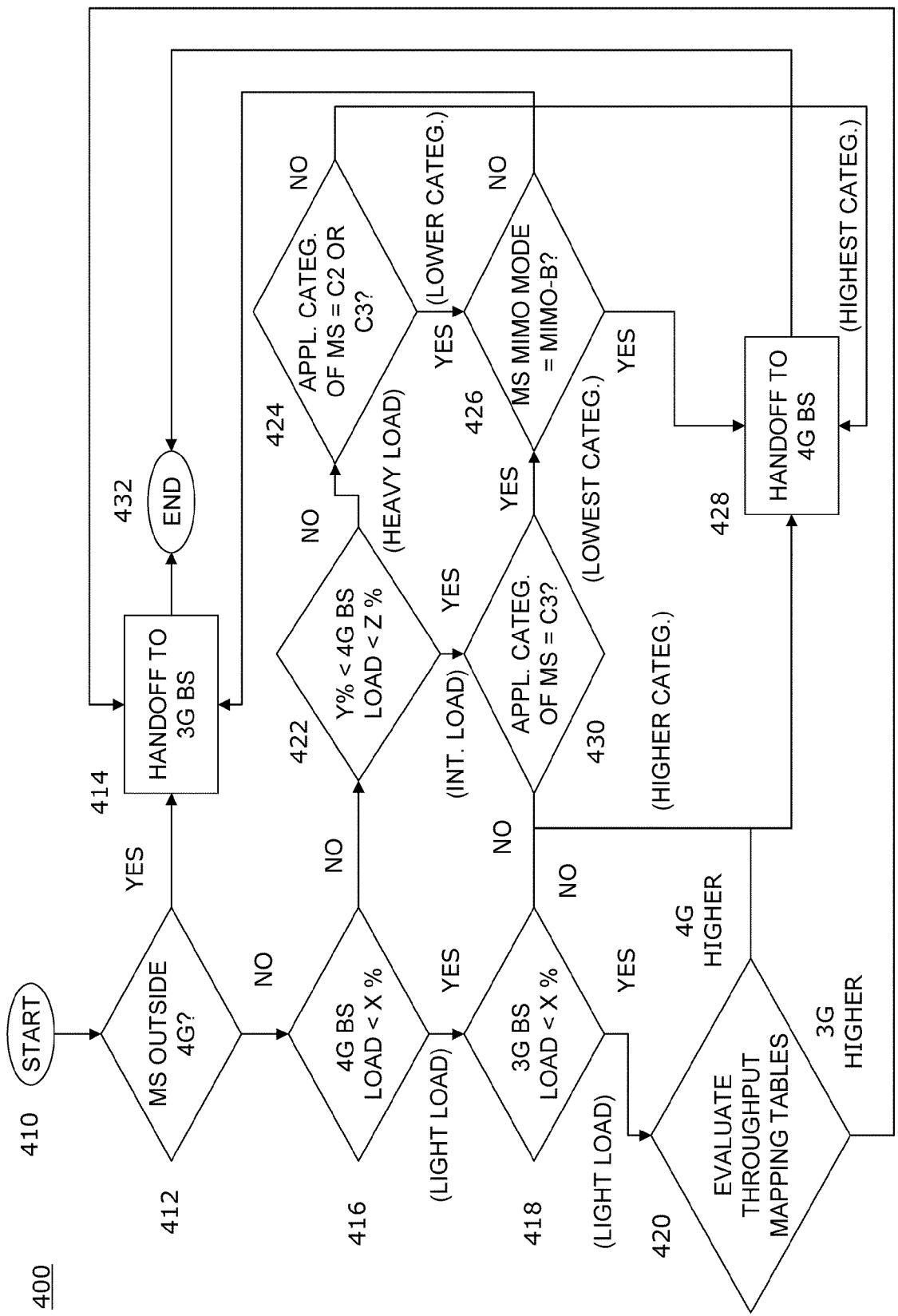
Figure 5B:
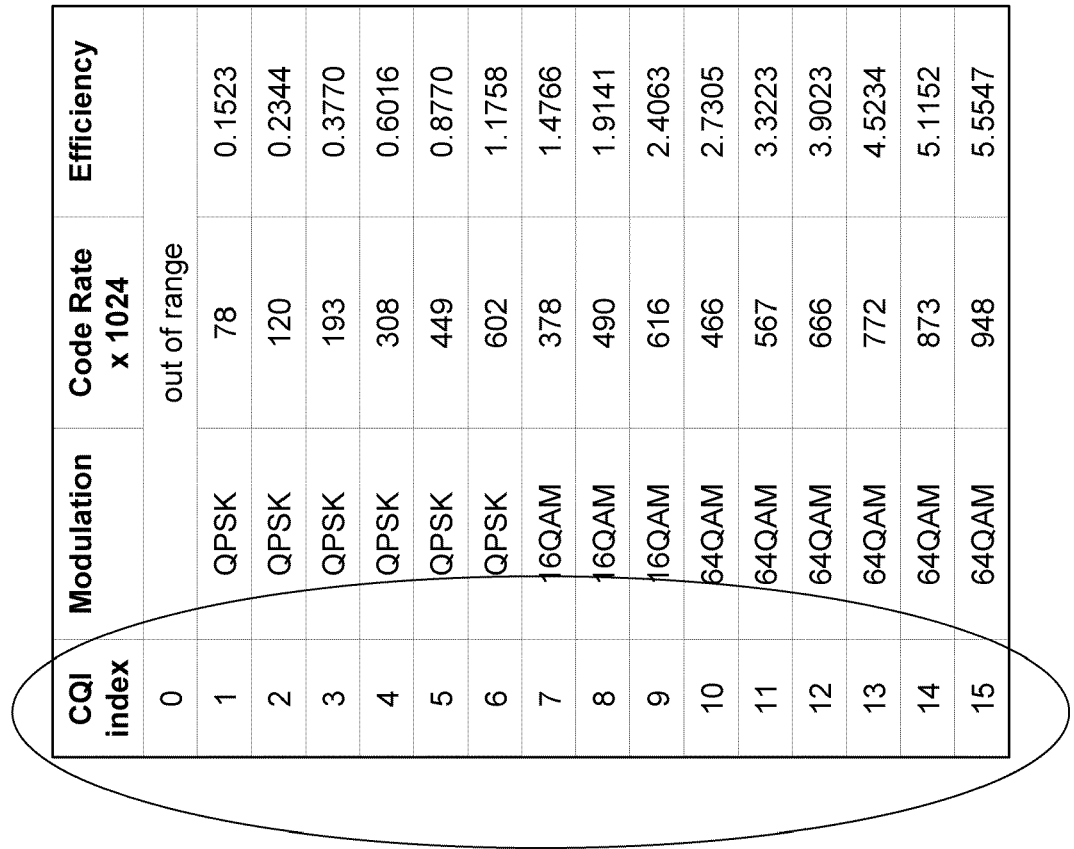

FIG. 1 provides a representation of a network arrangement having multimode 3G/4G devices operating therein;

FIG. 2 provides a block diagram of an exemplary embodiment of a multimode 3G/4G device, e.g., a CDMA/WiMAX or LTE device of this disclosure;

FIG. 3, provides an exemplary flowchart of a method of an embodiment of this disclosure using a user priority as a triggering mechanism;

FIG. 4 schematically illustrates an exemplary flowchart of an alternative method of an embodiment of this disclosure using an application category as a triggering mechanism;

FIG. 5A provides a table of exemplary MCS/CQI values related to throughput rates for a 4G WiMAX system;

FIG. 5B provides an exemplary table of 4-bit CQI values related to throughput rates applicable to a 4G LTE system;

FIG. 5C provides a table of exemplary MCS/DRC index values related to data rates for a 3G EvDO system;

FIGS. 6A and 6B illustrate conventional concepts of assigning different throughput parameters (related to available bandwidth) for each of three "Best Effort" (BE) user classes associated with WiMAX, i.e., Gold, Silver, and Bronze users; and FIG. 7 provides an exemplary mapping of application type to arbitrary QoS Categories.

DETAILED DESCRIPTION

In the discussion of various embodiments and aspects of the apparatus and method of this disclosure, examples of a processor may include any one or more of, for instance, a personal computer, portable computer, personal digital assistant (PDA), workstation, web-enabled mobile phone, WAP device, web-to-voice device, or other device. Further, examples of multimode or dual mode 3G/4G devices, e.g., CDMA/WiMAX or CDMA/LTE devices may include wireless phone handsets, smart phones, modems, laptop computers with embedded dual-mode functionality, mobile Internet devices such as used for video streaming, and other User Equipment (UE), for example.

Those with skill in the art will appreciate that the inventive concept described herein may work with various system configurations. In addition, various embodiments of this disclosure may be made in hardware, firmware, software, or any suitable combination thereof. Aspects of this disclosure may also be implemented as instructions stored on a machine-readable medium, which may be read and executed by one or more processors. A machine-readable medium may include any mechanism for storing or transmitting information in a form readable by a machine (e.g., a computing device, or a signal transmission medium), and may include a machine-readable transmission medium or a machine-readable storage medium. For example, a machine-readable storage medium may include read only memory, random access memory, magnetic disk storage media, optical storage media, flash memory devices, and others. Further, firmware, software, routines, or instructions may be described herein in terms of specific exemplary embodiments that may perform certain actions. However, it will be apparent that such descriptions are merely for convenience and that such actions in fact result from computing devices, processors, controllers, or other devices executing the firmware, software, routines, or instructions.

FIG. 1 depicts the architecture of a communications network 100 which may include one or more multimode/dual-mode 3G/4G devices 110 ("dual-mode device 110" or mobile station—"MS") implemented in accordance with various embodiments of this disclosure. For simplicity, only one dual-mode device 110 is illustrated, but it should be appreciated that the system and method of this disclosure are intended to apply to situations where there are multiple dual-mode devices throughout the coverage areas. Multimode device 110 may be configured to operate in both WiMAX and LTE networks, as well as in legacy 3G networks such as EvDO.

In FIG. 1, a variety of 4G Base Transceiver Stations or Base Stations ("BS") (e.g., 4G BS 120a-120d, or 120), with associated 4G coverage areas 101a-101d, e.g., WiMAX or LTE coverage areas, and 3G Base Transceiver Stations (3G BS 121a-121b, or 121), with associated 3G coverage areas 102a-102b, e.g., CDMA EvDO coverage areas, are depicted. Depending on the location of dual-mode device 110, i.e., in or out of 4G coverage overlap areas 103a-103e and other factors, described below, one or more of the 4G and/or 3G base stations may be capable of communicating with one or more dual-mode devices 110. The "?" in FIG. 1 indicates overlap coverage areas 103 in which overlapping 3G and 4G services are available, and for which conventional approaches have not optimized the handoffs between these different systems. Although not specifically illustrated, it should be understood that 4G BS 120 and 3G BS 121 contain various processors and memory devices and peripherals which may be used to carry out some or all of the functionality described herein. In other words, various aspects of this disclosure may be implemented in either a network base station or in a dual-mode communications device.

In WiMAX (and LTE) 4G networks, Channel Quality Indicator (CQI) is a measurement of the communication quality of a WiMAX wireless channel represented by a value (or values) that indicate a measure of channel quality for the given channel. Typically, a high value CQI is indicative of a channel with high quality. A CQI for a channel can be computed by making use of a performance metric, such as a signal-to-noise ratio (SNR), e.g., a carrier-to-interference noise ratio (CINR). CINR depicts the signal strength received by the WiMAX device, e.g., dual-mode device 110 from the WiMAX BS 120. In WiMAX mode, dual-mode device 110 sends a CQI based on the received CINR, which the base station translates to a data rate.

Based on the CQI, the Modulation and Coding Scheme (MCS) is allocated. The higher the MCS scheme, the better the data rate/throughput. For example, a communications system using orthogonal frequency division multiplexing (OFDM) can make use of a different CQI than a communications system that makes use of a different coding scheme. In more complex communications systems, such as those making use of multiple-input-multiple-output (MIMO) and space-time coded (STC) systems (e.g., MIMO-A in WiMAX) or spatial multiplexing (SM) (e.g., "MIMO-B" in WiMAX), the CQI used can also be dependent on receiver type. Other factors that may be taken into account in CQI are performance impairments, such as Doppler shift, channel estimation error, and interference. The table in FIG. 5A provides an example of MCS/CQI data rate options available in WiMAX and which are correlated to the CQI.

In 4G LTE systems, the Modulation and Coding Scheme (MCS) may be allocated similarly to WiMAX. The higher the MCS scheme, the better the data rate/throughput. For example, a communications system using orthogonal frequency division multiplexing (OFDM) can make use of a different CQI than a communications system that makes use of a different coding scheme. In more complex communications systems, such as those making use of multiple-input-multiple-output (MIMO) and space-time coded (STC) systems (e.g., "downlink transmit diversity" in LTE) or spatial multiplexing (SM) (e.g., "Multi-User-MIMO" or "MU-MIMO" in LTE), the CQI used can also be dependent on receiver type. Other factors that may be taken into account in CQI are performance impairments, such as Doppler shift, channel estimation error, and interference. The table in FIG. 5B provides an example of MCS/CQI data rate options available in LTE and which are correlated to the CQI.

As an example using the data in FIG. 5B (taken from the LTE standard), for a 20 MHz carrier bandwidth with FDD multiplexing and a single transmit antenna, the efficiency in the table of FIG. 5B must be multiplied by 20 Mbps×0.9 to obtain sector throughput. For example, for CQI=15, then the throughput would be (5.5547×20×0.9)≈100 Mbps. This example could change depending on various features activated in the LTE base station.

Similarly, in EvDO 3G systems, the access terminals send a DRC (Data Rate Control) signal on a DRC channel which requests the CDMA/EvDO BS 121 serve dual-mode device 110 with a certain data rate. The DRC signal may be implemented by a four-bit digital word, for example, to designate one of 12 transmission rates available in EvDO mode. The higher the DRC, the higher the MCS with which the CDMA BS 121 serves dual-mode device 110. The DRC may be selected based on the EvDO SINR (Signal-to-Interference-Ratio) that depicts the signal strength received by the device from the CDMA/EvDO BS 121. The table in FIG. 5C provides an example of MCS/DRC data rate options available in EvDO and which are correlated to the DRC Index.

In one or more exemplary embodiments, a handoff trigger uses a factor that maps WiMAX CQI to an equivalent or nearly equivalent EvDO DRC, and the corresponding MCS scheme that can be obtained. The mapping may be configurable by the user and/or manager of the network, and can be optimized for improved network performance. Likewise, a handoff trigger may use a factor that maps analogous LTE quality indications to an equivalent or nearly equivalent EvDO DRC, and the corresponding MCS scheme that can be obtained using LTE.

Various QoS categories may be established for various 3G/4G systems to assign relatively higher or lower priority to various application types. For example, streaming of high definition (HD) video, video conferencing, and voice (e.g., VoIP) may be assigned a highest QoS category, i.e., category "C1", while applications of lesser relative importance or with less stringent data latency requirements may be assigned lower QoS categories "C2" or "C3". The table in FIG. 7 provides an exemplary mapping of application type to an arbitrarily assignable QoS Category.

In FIG. 2, an exemplary embodiment of dual-mode device 110 includes 3G transceiver 210 operatively connected to antenna 215, and 4G transceiver 220, operatively connected to antenna 225. Alternative arrangements using a single antenna for both service types are possible. Baseband processing module 230 is configured to convert radio frequency (RF) signals from 3G transceiver 210 and 4G transceiver 220 to baseband signals. Processor 240 may represent one or more processors configured to execute various functionality associated with processing of information received and/or transmitted from antennas 215 and/or 225, including processing of information to determine a desirable or optimum network type to use in an area of overlapping 3G and 4G coverage.

Memory 250 may be configured to store various data and program instructions, and may include structured database 255 configured to store location data that identifies multiple service regions and 4G coverage areas by way of area location information, as discussed further below. In addition, various flags and indices may also be stored with appropriate association and linking in the structured database 255. For example, the table values in FIG. 5A illustrating MCS/CQI data rate options available in WiMAX, the table values in FIG. 5B illustrating MCS/CQI data rate options available in LTE, and the table values in FIG. 5C illustrating MCS/DRC data rate options available in EvDO may be stored in database 255.

Input/output controller 260 may operate in conjunction with user interface 270 to allow display of information to a user, for example, as well as to receive input from the user using conventional input/output devices, among other purposes.

Dual-mode device 110 may be pre-provisioned with 3G and 4G coverage map tables. Such coverage map tables may include the Latitude and Longitude or other indicia that represents 3G and/or 4G wireless coverage areas in each deployed market. In connection with this approach, optional GPS receiver 280 may be used with the pre-provisioned coverage map tables to allow a current position as reported by GPS to be used to determine the presence or absence of a 3G or 4G coverage area. Alternatively, or in addition, dual-mode device 110 may determine the presence of a 3G or 4G coverage area by conventional radio frequency (RF) sensing techniques. In a further alternative embodiment, 3G and 4G coverage map tables may be pre-provisioned in 4G BS 120 and/or 3G BS 121. In this alternative embodiment, the BS forces the handoff, and the processing load in the dual-mode device may thereby be reduced.

In one or more embodiments, a multi-technology handoff algorithm may be employed by, for example, a properly programmed processor, e.g., processor 240. One assumption in this algorithm is that the network comprises of a mix of 3G and 4G base stations. When dual-mode device 110 is outside a 4G service or coverage area 101, dual-mode device 110 can be configured to handoff to an available 3G network by default.

However, when dual-mode device 110 is in a coverage overlap area with acceptable 3G and 4G network access, e.g., one of the cross-hatched areas 103a-103e in FIG. 1, it may be configured to proceed in accordance with the following exemplary steps.

Step 1: If both 3G and 4G base stations 120 and 121 are lightly loaded (e.g., loading<40%), dual-mode device 110 will evaluate throughput mapping tables (e.g., for the EvDO and WiMAX configuration, the DRC-MCS (EvDO) and CQI-MCS (WiMAX) mapping tables) to determine which BS provides higher throughput, i.e., 4G BS 120 or 3G BS 121. Dual-mode device 110 will then handoff to the BS providing higher throughput. Alternatively, either of the base stations 120 or 121 can store the mapping tables and force a handoff rather than load the mobile device with such data and extra processing requirements. A similar approach can be used when 4G LTE is involved.

Step 2: If 4G BS 120 is intermediately loaded (e.g., 40%<loading<80%), MS user priority and MIMO type may be used to determine if handoff to 3G BS 121 is required. For example, if MS user priority is P3 and MIMO-B for WiMAX or Multi-User-MIMO mode (MU-MIMO) is being used in LTE, dual-mode device 110 may be configured to stay on the 4G network. However, if MS user priority is P3 and MIMO-A mode in WiMAX or "downlink transmit diversity" in LTE is being used, dual-mode device 110 may be configured to hand-off to 3G BS 121.

Step 3: If 4G BS 120 is heavily loaded (e.g., 80%<loading<100%), MS user priority and MIMO type will determine if handoff to 3G BS 121 is required. For example, if MS user priority is P2 or P3 and MIMO-B (WiMAX) or MU-MIMO (LTE) modes are being used, dual-mode device 110 may be configured to stay on the 4G network. However, if MS user priority is P2 or P3 and MIMO-A (WiMAX) or downlink transmit diversity (LTE) mode is being used, dual-mode device 110 may be configured to hand off to 3G BS 121.

It should be generally understood that it may be desirable for higher priority users using "better" MIMO or diversity modes (in terms of QoS or data throughput) to be retained in the 4G network, whereas relatively lower priority users using lower MIMO or diversity modes may be handed down to the 3G network. This helps maintain throughput and capacity utilization on the generally superior 4G network.

Turning now to FIG. 3, the exemplary flowchart of process 300 illustrates a generalized embodiment of the process described above in which it is assumed that dual-mode device 110 is in overlapping 3G and 4G coverage areas. In this embodiment, user priority may be used along with network loading and MIMO mode (e.g., space-time-coding or spatial multiplexing) to determine handoffs. Although the method below is detailed using WiMAX MIMO modes, it should be understood that corresponding LTE STC or diversity modes are equally applicable.

At step 310, dual-mode device 110 may be energized and initialized. At step 312, dual-mode device 110 determines whether it is inside or outside one of the 4G coverage areas 101a-101d (hereafter "4G coverage area 101"), as discussed above. If dual-mode device 110 is outside 4G coverage area 101, then a handoff to a 3G capable base station 121 is made at step 314. The process then ends at step 332.

If dual-mode device 110 determines that it is inside a 4G coverage area 101, 4G network loading is evaluated at step 316. If 4G network loading is relatively light, i.e., less than some network manager or user-determined value "X" %, e.g., 40% or other desired value, the overlapping 3G network loading is then evaluated at step 318. If 3G loading is also "light", e.g., less than X %, then the available options for data throughput for each of the 3G and 4G networks are evaluated at step 320 using, for example, processor 240 and throughput mapping tables (e.g., for the EvDO and WiMAX configuration, the DRC-MCS (EvDO) and CQI-MCS (WiMAX) mapping tables as depicted in FIGS. 5A and 5C for EvDO and WiMAX, respectively), which may be stored in database 255. The encircled CQI values in FIG. 5A and the encircled DRC Index values in FIG. 5C indicate values that may be "mapped" to each other in terms of comparable data rates when handing off between WiMAX to EvDO or from EvDO to WiMAX. Such "mapping" may be accomplished by use of a database. A similar approach may be taken for handoffs between LTE and EvDO using FIGS. 5B and 5C.

If it is determined at step 320 that 3G available throughput is higher than the corresponding 4G throughput, dual-mode device 110 may be handed off to 3G BS 121 at step 314. If, however, step 320 determines that 3G available throughput is less than the corresponding 4G throughput, dual-mode device 110 is handed off to 4G BS 120 at step 328.

If 4G BS 120 is not "lightly" loaded at step 316, i.e., if step 316 determines that loading is greater than X %, and if step 322 determines that the 4G network is intermediately loaded, i.e., Y %<4G Loading<Z % (where Y may be 40% and Z may be 80%, for example), the user priority is evaluated at step 330. If the user priority is greater than the lowest priority, e.g., higher priorities "P1" or "P2", then dual-mode device 110 is handed off to 4G BS 120 at step 328. The process then ends at step 332.

However, if 4G BS 120 is intermediately loaded at step 322, and if user priority in step 330 is determined to be the lowest priority, e.g., priority "P3", then the MIMO mode is evaluated at step 326. If MIMO-B mode is being used, i.e., spatial multiplexing (SM), then dual-mode device 110 is handed off to 4G BS 120 at step 328. The process then ends at step 332. If MIMO-B mode is not being used at step 326, i.e., MIMO-A Space Time Code (STC) is being used in WiMAX in which two or more antennas are employed at the transmitter and one antenna at the receiver, then dual-mode device 110 is handed off to 3G BS 121 at step 314. The process then ends at step 332.

If 4G BS 120 is not "intermediately" loaded, i.e., step 322 determines "high" loading, i.e., 4G Loading>Z % (where Z may be 80%, for example), the user priority is evaluated at step 324. If the user priority is the highest priority, e.g., priority "P1", then dual-mode device 110 is handed off to 4G BS 120 at step 328. The process then ends at step 332. If 4G BS 120 is "heavily" loaded at step 322, and if step 324 determines that the user priority is lower than the highest priority, e.g., priorities "P2" or "P3", then the MIMO mode is evaluated at step 326. If MIMO-B mode is being used, then dual-mode device 110 is handed off to 4G BS 120 at step 328. The process then ends at step 332. If MIMO-B mode is not being used at step 326, i.e., MIMO-A is being used, then dual-mode device 110 is handed off to 3G BS 121 at step 314. The process then ends at step 332.

If 4G network loading is relatively light at step 316, and if 3G loading is not "light" at step 318, e.g., 3G loading>X %, then dual-mode device 110 is handed off to 4G BS 120 at step 328. The process then ends at step 332.

Turning now to FIG. 4, an alternative exemplary flowchart of process 400 illustrates another generalized embodiment of the process described above in which it is assumed that dual-mode device 110 is in overlapping 3G and 4G coverage areas. In this embodiment, the application category may be used along with network loading and MIMO mode to determine handoffs.

At step 410, dual-mode device 110 may be energized and initialized. At step 412, dual-mode device 110 determines whether it is inside or outside one of the 4G coverage areas 101a-101d, as discussed above. If dual-mode device 110 is outside 4G coverage area 101, then a handoff to a 3G capable base station 121 is made at step 414. The process then ends at step 432.

If dual-mode device 110 determines that it is inside a 4G coverage area 101, 4G network loading is evaluated at step 416. If 4G network loading is relatively light, the overlapping EvDO network loading is then evaluated at step 418. If 3G loading is also "light", e.g., less than X %, then the available options for data throughput for each of the 3G and 4G networks are evaluated at step 420 using, for example, processor 240 to evaluate throughput mapping tables (e.g., for the EvDO and WiMAX configuration, the DRC-MCS (EvDO) and CQI-MCS (WiMAX) mapping tables) to determine the highest available throughput. The mapping table may be stored in database 255.

If it is determined at step 420 that 3G available throughput is higher than the corresponding 4G throughput, dual-mode device 110 may be handed off to 3G BS 121 at step 414. If, however, step 420 determines that 3G available throughput is less than the corresponding 4G throughput, dual-mode device 110 is handed off to 4G BS 120 at step 428.

If 4G BS 120 is not "lightly" loaded at step 416, and if step 422 determines that the 4G network is "intermediately" loaded, i.e., Y%<4G Loading<Z% (where Y may be 40% and Z may be 80%, for example), the application category is evaluated at step 430. If the application category is greater than the lowest application category, e.g., higher application categories "C1" or "C2", then dual-mode device 110 is handed off to 4G BS 120 at step 428. The process then ends at step 432.

However, if 4G BS 120 is intermediately loaded at step 422, and if the application category in step 430 is determined to be the lowest application category, e.g., application category "C3", then the MIMO mode is evaluated at step 426. If MIMO-B mode is being used, then dual-mode device 110 is handed off to 4G BS 120 at step 428. The process then ends at step 432. If MIMO-B mode is not being used at step 326, i.e., MIMO-A is being used, then dual-mode device 110 is handed off to 3G BS 121 at step 414. The process then ends at step 432.

If 4G BS 120 is not "intermediately" loaded, i.e., step 422 determines relatively "high" or "heavy" loading, i.e., 4G Loading>Z% (where Z may be 80%, for example), the application category is evaluated at step 424. If the application category is the highest application category, e.g., application category "C1", then dual-mode device 110 is handed off to 4G BS 120 at step 428. The process then ends at step 432. If 4G BS 120 is "heavily" loaded at step 422, and if step 424 determines that the application category is lower than the highest application category, e.g., application categories "C2" or "C3", then the MIMO mode is evaluated at step 426. If MIMO-B mode is being used, then dual-mode device 110 is handed off to 4G BS 120 at step 428. The process then ends at step 432. If MIMO-B mode is not being used at step 426, i.e., MIMO-A is being used, then dual-mode device 110 is handed off to 3G BS 121 at step 414. The process then ends at step 432.

If 4G network loading is relatively light at step 416, and if 3G loading is not "light" at step 418, e.g., 3G loading>X%, then dual-mode device 110 is handed off to 4G BS 120 at step 428. The process then ends at step 432.

Although the above embodiments are described with specific user priorities, e.g., P1, P2, and P3 and specific application categories C1, C2, and C3, the inventive concept is not limited to these specific priorities and application categories. More or less user priorities or application categories may be used as desired or appropriate for the particular needs of the network(s) in question.

Further, the above processes may be implemented as computer instructions embodied on a physical, tangible computer-readable medium which, when executed by a processor in dual-mode device 110, or in 4G BS 120 and 3G BS 121, carries out the functionality of the embodiments described above.

In addition, over-the-air provisioning of software updates and/or data updates may be made along the lines of the embodiments discussed above.

Those with skill in the art will appreciate that the inventive concept described herein may work with various system configurations. In addition, various embodiments of this disclosure may be made in hardware, firmware, software, or any suitable combination thereof. As discussed above, various aspects of this disclosure may also be implemented as instructions stored on a machine-readable medium, which may be read and executed by one or more processors. A machine-readable medium may include any mechanism for storing or transmitting information in a form readable by a machine (e.g., a computing device). For example, a machine-readable storage medium may include read only memory, random access memory, magnetic disk storage media, optical storage media, flash memory devices, and others. Further, firmware, software, routines, or instructions may be described herein in terms of specific exemplary embodiments that may perform certain actions. However, it will be apparent that such descriptions are merely for convenience and that such actions in fact result from computing devices, processors, controllers, or other devices executing the firmware, software, routines, or instructions.

Various embodiments may be described herein as including a particular feature, structure, or characteristic, but every aspect or embodiment may not necessarily include the particular feature, structure, or characteristic. Further, when a particular feature, structure, or characteristic is described in connection with an embodiment, it will be understood that such feature, structure, or characteristic may be included in connection with other embodiments, whether or not explicitly described. Thus, various changes and modifications may be made to this disclosure without departing from the scope or spirit of the inventive concept described herein. As such, the specification and drawings should be regarded as examples only, and the scope of the inventive concept to be determined solely by the appended claims.

What is claimed is:

1. A method of operating a multimode third generation (3G) and fourth generation (4G) communications device capable of operating in either a 4G network or a 3G network when in an area with overlapping 3G and 4G coverage, the method comprising:
    determining a loading condition of each of a 4G base station and a 3G base station associated with the overlapping 3G and 4G coverage area;
    responsive to a determination that each of the 3G and 4G base stations are loaded less than a first user determined load factor, using a processor to compare one or more 4G Channel Quality Indicators (CQI) with one or more corresponding 3G Data Rate Control (DRC) indices stored in corresponding mapping tables in a memory;
    evaluating the comparison result with the processor to determine which of the 3G and 4G networks allows a higher data throughput;
    handing off the dual mode communications device to a 4G base station associated with the 4G coverage if the 4G network allows the higher data throughput; and
    otherwise, handing off the dual mode communications device to a 3G base station associated with the 3G coverage.

2. The method of claim 1, wherein the 3G base station comprises a CDMA/EvDO base station.

3. The method of claim 1, wherein the 4G base station comprises a WiMAX base station.

4. The method of claim 1, wherein the 4G base station comprises an LTE base station.

5. The method of claim 1, further comprising:
    responsive to a determination that the 4G network is intermediately loaded at a load value greater than the first user determined load factor and less than a second user determined load factor that is greater than the first user determined load factor, using the processor to evaluate a user priority and a multi-input-multi-output (MIMO) mode associated with the 4G network; and
    if the user priority is a lowest user priority and the MIMO mode comprises spatial multiplexing, assigning the dual mode communications device to the 4G network.

6. The method of claim 5, wherein the MIMO mode comprising spatial multiplexing is WiMAX MIMO-B.

7. The method of claim 5, wherein the MIMO mode comprising spatial multiplexing is LTE MU-MIMO.

8. The method of claim 1, further comprising:
responsive to a determination that the 4G network is intermediately loaded at a load value greater than the first user determined load factor and less than a second user determined load factor that is greater than the first user determined load factor, using the processor to evaluate a user priority and a multi-input-multi-output (MIMO) mode associated with the 4G network; and
if the user priority is a lowest user priority and the MIMO mode comprises space-time-coding, assigning the dual mode communications device to the 3G network.

9. The method of claim 8, wherein the MIMO mode comprising space-time-coding is WiMAX MIMO-A.

10. The method of claim 8, wherein the MIMO mode comprising space-time-coding is an LTE downlink transmit diversity mode.

11. The method of claim 1, further comprising:
responsive to a determination that the 4G network is intermediately loaded at a load value greater than the first user determined load factor and less than a second user determined load factor that is greater than the first user determined load factor, using the processor to evaluate a user priority; and
if the user priority is greater than a lowest user priority, assigning the dual mode communications device to the 4G network.

12. The method of claim 1, further comprising:
responsive to a determination that the 4G network is heavily loaded at a load value greater than a second user determined load factor that is greater than the first user determined load factor, using the processor to evaluate a user priority and a multi-input-multi-output (MIMO) mode associated with the 4G network; and
if the user priority is less than a highest user priority and the MIMO mode comprises spatial multiplexing, assigning the dual mode communications device to the 4G network.

13. The method of claim 12, wherein the MIMO mode comprising spatial multiplexing is WiMAX MIMO-B.

14. The method of claim 12, wherein the MIMO mode comprising spatial multiplexing is LTE MU-MIMO.

15. The method of claim 1, further comprising:
responsive to a determination that the 4G network is heavily loaded at a load value greater than a second user determined load factor that is greater than the first user determined load factor, using the processor to evaluate a user priority and a multi-input-multi-output (MIMO) mode associated with the 4G network; and
if the user priority is less than a highest user priority and the MIMO mode comprises space-time-coding, assigning the dual mode communications device to the 3G network.

16. The method of claim 15, wherein the MIMO mode comprising space-time-coding is WiMAX MIMO-A.

17. The method of claim 15, wherein the MIMO mode comprising space-time-coding is an LTE downlink transmit diversity mode.

18. The method of claim 1, further comprising:
responsive to a determination that the 4G network is heavily loaded at a load value greater than a second user determined load factor that is greater than the first user determined load factor, using the processor to evaluate a user priority; and
if the user priority is a highest user priority, assigning the dual mode communications device to the 4G network.

19. The method of claim 1, further comprising:
responsive to a determination that the 4G network is intermediately loaded at a load value greater than the first user determined load factor and less than a second user determined load factor that is greater than the first user determined load factor, using the processor to evaluate an application category and a multi-input-multi-output (MIMO) mode associated with the 4G network; and
if the application category is a lowest application category and the MIMO mode comprises spatial multiplexing, assigning the dual mode communications device to the 4G network.

20. The method of claim 19, wherein the MIMO mode comprising spatial multiplexing is WiMAX MIMO-B.

21. The method of claim 19, wherein the MIMO mode comprising spatial multiplexing is LTE MU-MIMO.

22. The method of claim 1, further comprising:
responsive to a determination that the 4G network is intermediately loaded at a load value greater than the first user determined load factor and less than a second user determined load factor that is greater than the first user determined load factor, using the processor to evaluate an application category and a multi-input-multi-output (MIMO) mode associated with the 4G network; and
if the application category is a lowest application category and the MIMO mode comprises space-time-coding, assigning the dual mode communications device to the 3G network.

23. The method of claim 22, wherein the MIMO mode comprising space-time-coding is WiMAX MIMO-A.

24. The method of claim 22, wherein the MIMO mode comprising space-time-coding is an LTE downlink transmit diversity mode.

25. The method of claim 1, further comprising:
responsive to a determination that the 4G network is intermediately loaded at a load value greater than the first user determined load factor and less than a second user determined load factor that is greater than the first user determined load factor, using the processor to evaluate an application category; and
if the application category is greater than a lowest user priority, assigning the dual mode communications device to the 4G network.

26. The method of claim 1, further comprising:
responsive to a determination that the 4G network is heavily loaded at a load value greater than a second user determined load factor that is greater than the first user determined load factor, using the processor to evaluate an application category and a multi-input-multi-output (MIMO) mode associated with the 4G network; and
if the application category is less than a highest application category and the MIMO mode comprises spatial multiplexing, assigning the dual mode communications device to the 4G network.

27. The method of claim 26, wherein the MIMO mode comprising spatial multiplexing is WiMAX MIMO-B.

28. The method of claim 26, wherein the MIMO mode comprising spatial multiplexing is LTE MU-MIMO.

29. The method of claim 1, further comprising:
responsive to a determination that the 4G network is heavily loaded at a load value greater than a second user determined load factor that is greater than the first user determined load factor, using the processor to evaluate an application category and a multi-input-multi-output (MIMO) mode associated with the 4G network; and if the application category is less than a highest application category and the MIMO mode comprises space-time-coding, assigning the dual mode communications device to the 3G network.

30. The method of claim 29, wherein the MIMO mode comprising space-time-coding is WiMAX MIMO-A.

31. The method of claim 29, wherein the MIMO mode comprising space-time-coding is an LTE downlink transmit diversity mode.

32. The method of claim 1, further comprising:
responsive to a determination that the 4G network is heavily loaded at a load value greater than a second user determined load factor that is greater than the first user determined load factor, using the processor to evaluate an application category; and
if the application category is a highest user priority, assigning the dual mode communications device to the 4G network.

33. A multimode third generation (3G) and fourth generation (4G) communications apparatus capable of operating in either a 3G network or a 4G network when in an area with overlapping 3G and 4G coverage, the apparatus comprising:
a 3G transceiver configured to transmit and receive information over a 3G network;
a 4G transceiver configured to selectively transmit and receive data over a 4G network;
a processor operatively coupled to the 3G transceiver and the 4G transceiver and which is configured to determine a loading condition of each of a 3G base station and a 4G base station associated with the overlapping 3G and 4G coverage area; and
a memory device operatively coupled to the processor;
wherein, responsive to a determination by the processor that each of the 3G and 4G base stations are loaded less than a first user determined load factor, the processor is configured to compare one or more 4G Channel Quality Indicators (CQI) with one or more corresponding 3G Data Rate Control (DRC) indices stored in corresponding mapping tables in the memory;
wherein the processor evaluates the comparison result to determine which of the 4G and 3G networks allows a higher data throughput,
wherein, if the 4G network allows the higher data throughput, the processor enables control signals that transfer or maintain communication of the dual mode communications device with a 4G base station associated with the 4G coverage, and
wherein, if the 3G network allows the higher data throughput, the processor enables different control signals that transfer communication of the dual mode communications device to a 3G base station associated with the 3G coverage.

34. The apparatus of claim 33, wherein, responsive to a determination that the 4G network is intermediately loaded at a load value greater than the first user determined load factor and less than a second user determined load factor that is greater than the first user determined load factor, the processor is further configured to evaluate a user priority and a multi-input-multi-output (MIMO) mode associated with the 4G network; and
if the user priority is a lowest user priority and the MIMO mode comprises spatial multiplexing, the processor assigns the dual mode communications device to the 4G network.

35. The apparatus of claim 34, wherein the MIMO mode comprising spatial multiplexing is WiMAX MIMO-B.

36. The apparatus of claim 34, wherein the MIMO mode comprising spatial multiplexing is LTE MU-MIMO.

37. The apparatus of claim 33, wherein, responsive to a determination that the 4G network is intermediately loaded at a load value greater than the first user determined load factor and less than a second user determined load factor that is greater than the first user determined load factor, the processor is further configured to evaluate a user priority and a multi-input-multi-output (MIMO) mode associated with the 4G network; and
if the user priority is a lowest user priority and the MIMO mode comprises space-time-coding, the processor assigns the dual mode communications device to the 3G network.

38. The apparatus of claim 37, wherein the MIMO mode comprising space-time-coding is WiMAX MIMO-A.

39. The apparatus of claim 37, wherein the MIMO mode comprising space-time-coding is an LTE downlink transmit diversity mode.

40. The apparatus of claim 33, wherein, responsive to a determination that the 4G network is intermediately loaded at a load value greater than the first user determined load factor and less than a second user determined load factor that is greater than the first user determined load factor, the processor is further configured to evaluate a user priority; and
if the user priority is greater than a lowest user priority, the processor assigns the dual mode communications device to the 4G network.

41. The apparatus of claim 33, wherein, responsive to a determination that the 4G network is heavily loaded at a load value greater than a second user determined load factor that is greater than the first user determined load factor, the processor is further configured to evaluate a user priority and a multi-input-multi-output (MIMO) mode associated with the 4G network; and
if the user priority is less than a highest user priority and the MIMO mode comprises spatial multiplexing, the processor assigns the dual mode communications device to the 4G network.

42. The apparatus of claim 41, wherein the MIMO mode comprising spatial multiplexing is WiMAX MIMO-B.

43. The apparatus of claim 41, wherein the MIMO mode comprising spatial multiplexing is LTE MU-MIMO.

44. The apparatus of claim 33, wherein, responsive to a determination that the 4G network is heavily loaded at a load value greater than a second user determined load factor that is greater than the first user determined load factor, the processor is further configured to evaluate a user priority and a multi-input-multi-output (MIMO) mode associated with the 4G network; and
if the user priority is less than a highest user priority and the MIMO mode comprises space-time-coding, the processor assigns the dual mode communications device to the 3G network.

45. The apparatus of claim 44, wherein the MIMO mode comprising space-time-coding is WiMAX MIMO-A.

46. The apparatus of claim 44, wherein the MIMO mode comprising space-time-coding is an LTE downlink transmit diversity mode.

47. The apparatus of claim 33, wherein, responsive to a determination that the 4G network is heavily loaded at a load value greater than a second user determined load factor that is greater than the first user determined load factor, the processor is further configured to evaluate a user priority; and
if the user priority is a highest user priority, the processor assigns the dual mode communications device to the 4G network.

48. The apparatus of claim 33, wherein, responsive to a determination that the 4G network is intermediately loaded at a load value greater than the first user determined load factor and less than a second user determined load factor that is greater than the first user determined load factor, the processor is further configured to evaluate an application category and a multi-input-multi-output (MIMO) mode associated with the 4G network; and if the application category is a lowest application category and the MIMO mode comprises spatial multiplexing, the processor assigns the dual mode communications device to the 4G network.

49. The apparatus of claim 48, wherein the MIMO mode comprising spatial multiplexing is WiMAX MIMO-B.

50. The apparatus of claim 48, wherein the MIMO mode comprising spatial multiplexing is LTE MU-MIMO.

51. The apparatus of claim 33, wherein, responsive to a determination that the 4G network is intermediately loaded at a load value greater than the first user determined load factor and less than a second user determined load factor that is greater than the first user determined load factor, the processor is further configured to evaluate an application category and a multi-input-multi-output (MIMO) mode associated with the 4G network; and if the application category is a lowest application category and the MIMO mode comprises space-time-coding, the processor assigns the dual mode communications device to the 3G network.

52. The apparatus of claim 51, wherein the MIMO mode comprising space-time-coding is WiMAX MIMO-A.

53. The apparatus of claim 51, wherein the MIMO mode comprising space-time-coding is an LTE downlink transmit diversity mode.

54. The apparatus of claim 33, wherein, responsive to a determination that the 4G network is intermediately loaded at a load value greater than the first user determined load factor and less than a second user determined load factor that is greater than the first user determined load factor, the processor is further configured to evaluate an application category; and if the application category is greater than a lowest user priority, the processor assigns the dual mode communications device to the 4G network.

55. The apparatus of claim 33, wherein, responsive to a determination that the 4G network is heavily loaded at a load value greater than a second user determined load factor that is greater than the first user determined load factor, the processor is further configured to evaluate an application category and a multi-input-multi-output (MIMO) mode associated with the 4G network; and if the application category is less than a highest application category and the MIMO mode comprises spatial multiplexing, the processor assigns the dual mode communications device to the 4G network.

56. The apparatus of claim 55, wherein the MIMO mode comprising spatial multiplexing is WiMAX MIMO-B.

57. The apparatus of claim 55, wherein the MIMO mode comprising spatial multiplexing is LTE MU-MIMO.

58. The apparatus of claim 33, wherein, responsive to a determination that the 4G network is heavily loaded at a load value greater than a second user determined load factor greater than the first user determined load factor, the processor is further configured to evaluate an application category and a multi-input-multi-output (MIMO) mode associated with the 4G network; and if the application category is less than a highest application category and the MIMO mode comprises space-time-coding, the processor assigns the dual mode communications device to the 3G network.

59. The apparatus of claim 58, wherein the MIMO mode comprising space-time-coding is WiMAX MIMO-A.

60. The apparatus of claim 58, wherein the MIMO mode comprising space-time-coding is an LTE downlink transmit diversity mode.

61. The apparatus of claim 33, wherein, responsive to a determination that the 4G network is heavily loaded at a load value greater than a second user determined load factor that is greater than the first user determined load factor, the processor is further configured to evaluate an application category; and if the application category is a highest user priority, the processor assigns the dual mode communications device to the 4G network.

62. A computer-readable medium comprising computer readable code physically embodied thereon which, when executed by a processor arranged in a multimode third generation (3G) and fourth generation (4G) communications device capable of operating in either a 4G network or a 3G network mode causes the processor to carry out the functions of:

determining a loading condition of each of a 4G base station and a 3G base station associated with an overlapping 3G and 4G coverage area;

responsive to a determination that each of the 3G and 4G base stations are loaded less than a first user inputted load factor, using a processor to compare one or more 4G Channel Quality Indicators (CQI) with one or more corresponding 3G Data Rate Control (DRC) indices stored in corresponding mapping tables in a memory;

evaluating the comparison result with the processor to determine which of the 4G and 3G networks allows a higher data throughput;

handing off the dual mode communications device to a 4G base station associated with the 4G coverage if the 4G network allows the higher data throughput; and otherwise, handing off the dual mode communications device to an 3G base station associated with the EvDO coverage.

63. A method of over-the-air provisioning of program functionality and data stored in a multimode third generation (3G) and fourth generation (4G) communications device capable of sending program instruction updates to the multimode device over a communications link operating in either a 4G network or a 3G network mode, the method comprising: from a base station (BS), wherein the program instruction updates include computer code that, when executed by a processor:

determines a loading condition of each of a 4G base station and a 3G base station associated with an overlapping 3G and 4G coverage area, compares one or more 4G Channel Quality Indicators (CQI) with one or more corresponding 3G Data Rate Control (DRC) indices stored in corresponding mapping tables in a memory if each of the 3G and 4G base stations are loaded less than a first user inputted load factor, determines which of the 3G and 4G networks allows a higher data throughput, causes the dual mode communications device to transfer to a 4G base station associated with the 4G coverage if the 4G network allows the higher data throughput or causes the dual mode communications device to transfer to an 3G base station associated with the 3G coverage if the 3G network allows the higher data throughput;

sending data updates to the dual-mode device over the communications link from the BS, wherein the data updates comprise 4G Channel Quality Indicators (CQI) mapped to one or more corresponding 3G Data Rate Control (DRC) indices; and storing the program instruction updates and the data updates in a memory in the dual mode communications device.

* * * * *